Sept. 28, 1954 R. G. McLAGAN Re. 23,881

SLEEVE PRESS

Original Filed Sept. 9, 1950 3 Sheets-Sheet 1

INVENTOR.
RUSSELL G. McLAGAN

BY

Hyde, Mayer, Baldwin & Doran
ATTORNEYS

SLEEVE PRESS

Original Filed Sept. 9, 1950 3 Sheets-Sheet 2

INVENTOR.
RUSSELL G. McLAGAN
BY
Hyde, Mayer, Baldwin & Doran
ATTORNEYS

SLEEVE PRESS

Original Filed Sept. 9, 1950 3 Sheets-Sheet 3

INVENTOR.
RUSSELL G. McLAGAN
BY
Hyde, Meyer, Baldwin & Doran
ATTORNEYS

Reissued Sept. 28, 1954

Re. 23,881

UNITED STATES PATENT OFFICE 23,881

SLEEVE PRESS

Russell G. McLagan, Milford, Ohio, assignor to The American Laundry Machinery Company, Cincinnati, Ohio, a corporation of Ohio Original No. 2,629,522, dated February 24, 1953, Serial No. 184,035, September 9, 1950. Application for reissue February 19, 1954, Serial No. 411,601

14 Claims. (Cl. 223—57)

Matter enclosed in heavy brackets [ ] appears in the original patent but forms no part of this reissue specification; matter printed in italics indicates the additions made by reissue.

This invention relates to improvements in a shirt sleeve press of the type having two bucks over which the sleeves are drawn, after which the bucks are brought into registration between pairs of pressing members which press the entire length of each sleeve between the cuff and the shoulder seam. More specifically, the present invention relates to improvements in the means by which the bucks are automatically brought into proper registration with the pressing chests at a position such that the sleeve is pressed exactly up to the shoulder seam regardless of the length of the sleeve.

An object of the present invention is to provide, in a press of the type described above, an operator-operated measuring device connected with a follow up mechanism so related to a buck positioning device that mere movement of the measuring device to the shoulder seam of the sleeve on the buck will cause the follow up mechanism to automatically position the buck in the proper position for pressing the sleeve up to the shoulder seam only.

A further object of the present invention is to provide a measuring device as described in the preceding paragraph coupled with means for initiating a pressing operation so that, with what amounts to a single movement, the operator may properly position the buck according to the length of the sleeve thereon and immediately initiate a pressing operation, thus saving time.

A further object of the present invention is the arrangement of the bucks and pressing chests so that the bucks are automatically carried away from the operator for the performance of the pressing operation so that there is no danger of an operator being hurt.

Still another object of the invention is the provision of a novel follow up mechanism wherein an easily operated part is positioned by the operator after which a heavier mechanism is positioned accordingly so that the buck is in proper position to carry out a pressing operation without fatiguing work on the part of the operator.

The invention further resides in the provision of novel means and mechanism for carrying out the various functions as will be more clearly understood from the accompanying drawings and description and the essential features will be set forth in the appended claims.

Figure 7:
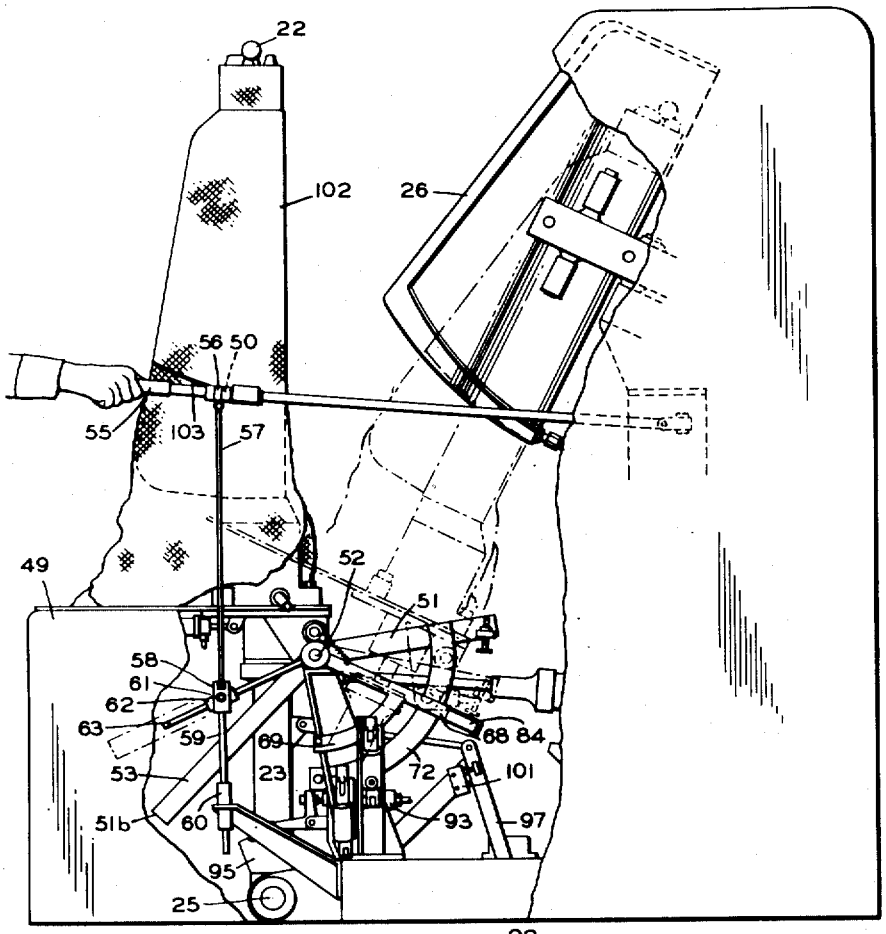
Figure 8:
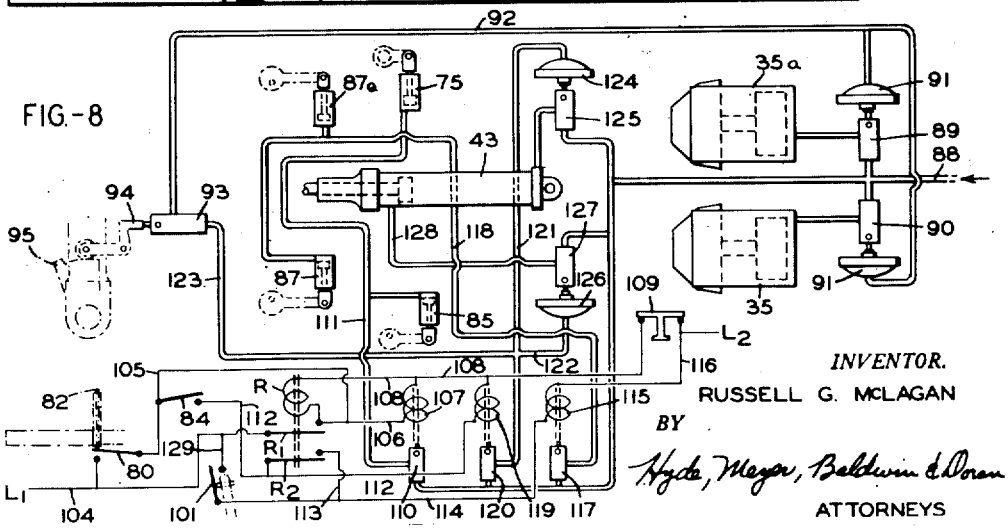

Fig. 7 is a side-elevational view of the complete machine with the casing broken away to show the measuring mechanism and illustrating the measuring rod or feeler elevated somewhat to measure a shirt sleeve shown in full line position of the buck and in dot-dash position corresponding to a pressing operation, some of the associated elements being thereby moved while others are still in unoperated position, as will be described; while Fig. 8 is a combined pneumatic electrical diagram of those parts concerned with the operating structure.

My invention is applicable to any press where a single buck is moved first into a registration position between two coacting pressing chests after which the chests are brought together for a pressing operation. This is true whether the movable pressing member moves in a horizontal plane or in a vertical plane. However, my invention is particularly useful in a press for simultaneously ironing the two sleeves of a shirt and I will describe that embodiment, defining the essential features of my invention in the claims as applicable to other types of press. Since a large part of the mechanism is merely a duplication so as to take care of two bucks, I will explain the same in connection with the buck seen in Figs. 1 and 7 and at the left in Fig. 4, applying the same reference numerals with the suffix "*a*" to similar parts of the other mechanism.

On a frame 10 there is mounted a buck 11 of a double convex form commonly known in this art. The main portion of the buck is non-tapering and of uniform conformation from top to bottom. This portion of the buck is covered by a padding 12 of the usual character. Extending vertically along the front face of the buck is a thin expander fin 13 diverging forwardly and outwardly from top to bottom of the buck. This fin is mounted for reciprocation in the buck and is urged outwardly or forwardly by means of a lever 14 pivoted on the base 15 at 16 and connected at its lower end with the piston rod 17 of a small air servomotor 18 which is supplied by air through a usual valve arrangement subject to a control member 19 placed for easy reach of the knee of the operator. Operation of the control member 19 causes the fin 13 to be pushed forwardly or outwardly so as to stretch the sleeve tightly for a pressing operation. At the upper end of the buck there is an extension 20 of smaller cross section to receive the cuff of the shirt and this is provided with a clip 21 for temporarily holding the cuffs when the sleeve is draped on the buck. A lever 22 controls the cuff holder 21 in a known manner and has no part in the present invention. It will be noted in Fig. 7 that when the buck reaches the dot-dash position for a pressing operation, the handle 22 is between the wings of the pressing chest and the arrangement is such that the lever 22 is engaged by a wing of the pressing chest and moved inwardly during a pressing operation to release the cuff holder. This permits a quick stripping of the sleeve from the buck when it again returns to the operator after a pressing operation.

The buck is provided with a vertical mounting which comprises the telescoping parts consisting of sleeve 23 and the internal rod 24. The rod 24 is rigidly connected with the buck while the sleeve 23 has a pivotal mounting on the frame 10 at the point 25. This permits the buck and its vertical mounting to be oscillated toward the rear from the position of Fig. 1 to the dot-dash position of Fig. 7 about the pivot 25 and my invention provides means for changing the vertical position of the buck by the telescoping parts 23 and 24 to accommodate sleeves of different length as will presently appear.

Figure 2:
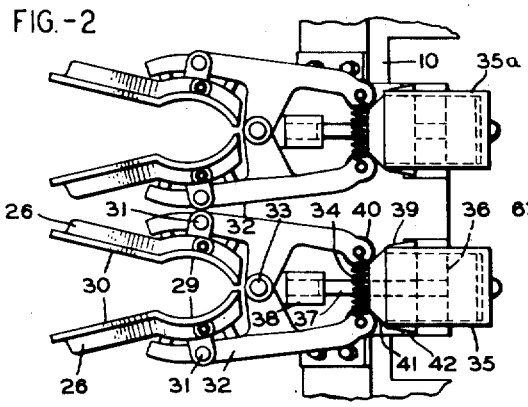
Fig. 2 is a fragmental top plan view taken along the line 2—2 of Fig. 1 sufficient to show the shape of the pressing chests and the pressure producing means.

The buck 11, 13 is adapted to move into a registering position between a pair of pressing chests 26 which are hollow and provided with steam through the connections 27, 28 so as to heat the same in a well known manner. Each wing of the pressing chest has a concave portion 29 and these two concave portions 29 together substantially completely embrace the double convex portion 11 of the buck with its padding. Each chest wing also has a flat portion 30 adapted to press against that portion of the sleeve which is stretched forwardly by the fin 13. Each pressing chest is pivotally mounted at 31 on a lever 32 which has a fixed pivotal mounting 33 on the main frame. A spring 34 connected between the inner ends of the levers 32 normally holds the wings of the pressing chest in open position as shown in Fig. 2. Means is provided for closing the pressing chest and consists of a motor 35 comprising a cylinder fitted with a piston 36, having a piston rod 37 provided with an outboard bearing at 38. Carried by the piston rod is a wedge 39 adapted to enter between rollers 40 on the rear end of levers 32 so as to force the levers apart, causing the pressing chests to come together in a pressing action. The forward portion of this wedge at 41 provides a rapid movement while the rearward portion 42 causes a slower but more powerful movement of the pressing members. It will be noted in Fig. 7 that the elements of the pressing chest are positioned radially with respect to the pivot 25 so that the buck is properly coordinated with the pressing chest when it reaches registration position prior to a pressing operation.

Figure 1:
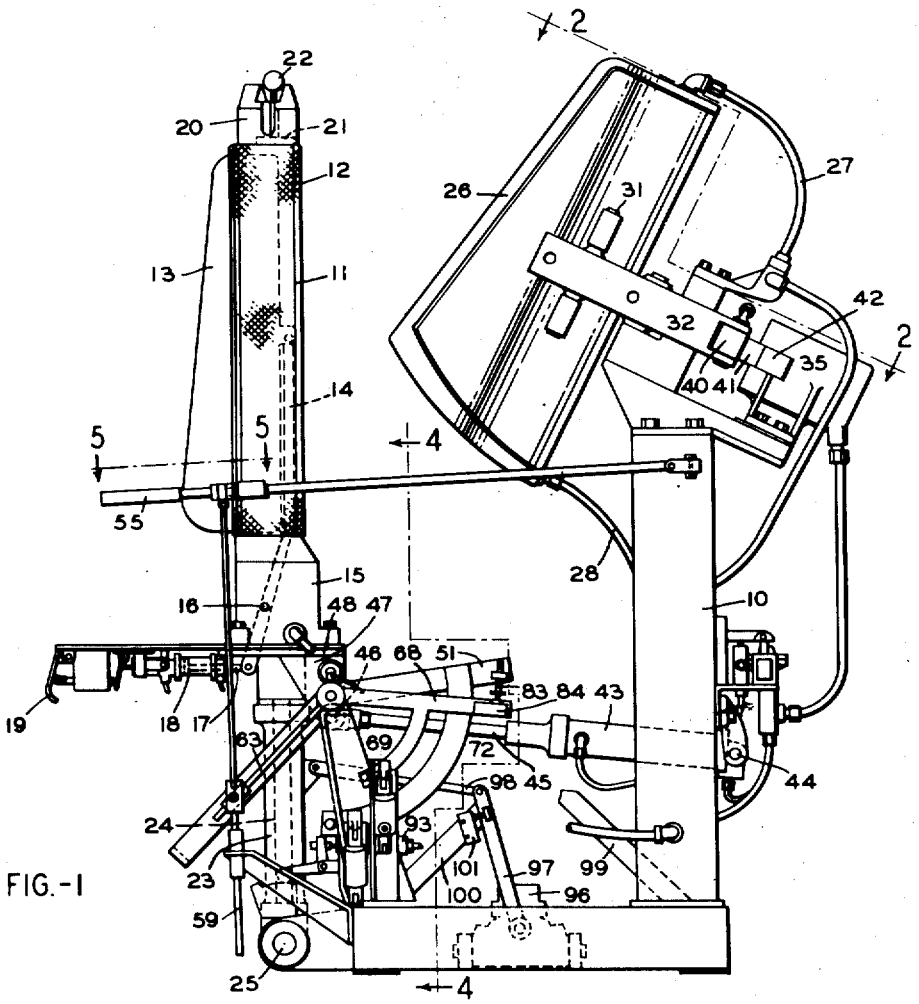
Fig. 1 is a side-elevational view of the complete pressing machine with the casing removed and with the parts in a normal unoperated position.

Power means is provided for moving the buck from the position of Fig. 1 to the dot-dash position of Fig. 7. This means comprises a cylinder and piston motor 43, the cylinder of which has a pivoted connection at 44 with the frame 10. The piston rod 45 of this motor is pivotally connected at 46 with a bracket 47 which depends from a plate 48 upon which the base 15 of the buck is mounted. As will later appear, a normally open valve urges the piston of motor 43 toward its forwardmost position so as to normally hold the buck 11 in the position of Fig. 1 on the table 49.

Figure 5:
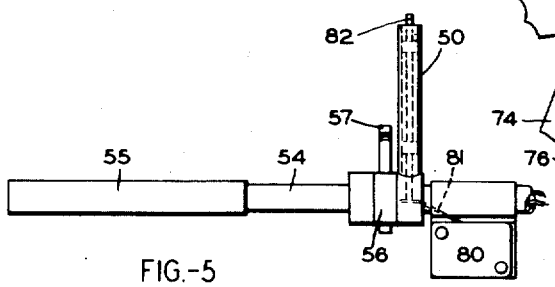
Fig. 5 is an enlarged fragmental plan view of the handle and associated parts of the measuring mechanism taken generally along the line 5—5 of Fig. 1.

Generally speaking, an operator operated finger 50 (Figs. 5 and 7) is provided which is touched to the shoulder seam of shirt sleeve draped on the buck 11 and this is associated with a follow up mechanism whereby the buck is then automatically positioned so that the shoulder seam of the sleeve will enter the pressing chests 26 just at the lower end thereof so as to properly press the sleeve right up to the shoulder line but no farther. Various types of follow up mechanism might be utilized to cause the buck to take the proper position following the movement of the finger 50. In the present invention I have utilized an inclined track 51 pivotally mounted on the frame at 52 and having a forwardly extending counterbalance 53. The position of the track 51 is shown in full lines in Fig. 7 for approximately the longest sleeve and in dot-dash lines there for approximately the shortest sleeve. In actual practice, the range is not very great. A pair of rollers 51′ is mounted, one on each side, one bracket 47 downwardly extending from plate 48 and these rollers ride on track 51. Thus, it can be seen that if the track be swung clockwise a sufficient distance, the pivoted buck assemblies could simply swing about pivot point 25 without any longitudinal extension of members 24, or that (as in actual practice) the track can be positioned at a more counterclockwise position so that as the buck groups swing back toward the chests, the rollers, riding up track 51, cause the buck supports to move up with members 23 sliding up on members 24. As mentioned above, the adjustment as used is such that the buck group always moves up a smaller or larger distance. The adjustment is designed so that the normal track setting shown in Fig. 1 would be the limit for the longest sleeve, while a track angle a little more clockwise than that shown in dot-dash lines in Fig. 7 would be the limit for the shortest sleeves. Actually the standard shirt sizes fall within narrower limits.

While the measuring finger 50 might be connected directly to the mechanism of track 51 so as to properly position it, I prefer to use a pilot member which is very easily manipulated, after which automatic mechanism causes the track 51 to follow the position of the pilot member.

Figure 3:
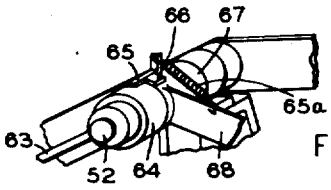
Fig. 3 is an enlarged perspective detail view of a portion of the measuring mechanism and taken generally from the position of the line 3—3 of Fig. 4.

The finger 50 is rigidly mounted on a hollow tube 54 which is provided at its front end with a handle 55 to be grasped by the operator. To a collar 56 freely rotatable on tube 54 there is pivotally connected a downwardly extending rod 57 which, at its lower end is pivotally connected to a block 58 which in turn is rigidly connected to a rod 59 passing through a sleeve 60 rigidly mounted on the frame, the rod 59 being slidable vertically in the sleeve 60 so as to guide the movement of block 58. A swivel connection 61 mounts another block 62 to block 58. Freely slidable through the center of block 62 is a rod 63 which, as best seen in Fig. 3, is radially connected to a sleeve 64 which is rotatably mounted about the pivot 52. A projecting nose 65 on sleeve 64 is biased by spring 65a to engage a projection 66 on a second sleeve 67 which is also freely rotatable about the pivot 52. Rigid with the sleeve 67 is a stop arm 68. This stop arm is provided with an arcuate guide 69 which passes through a receiving opening 70 in an angle bracket 71 connected to the main frame 10. The track 51 is provided with an arcuate guide 72 passing through a suitable receiving opening 73 in a pedestal 74 fastened to the main frame.

Figure 4:
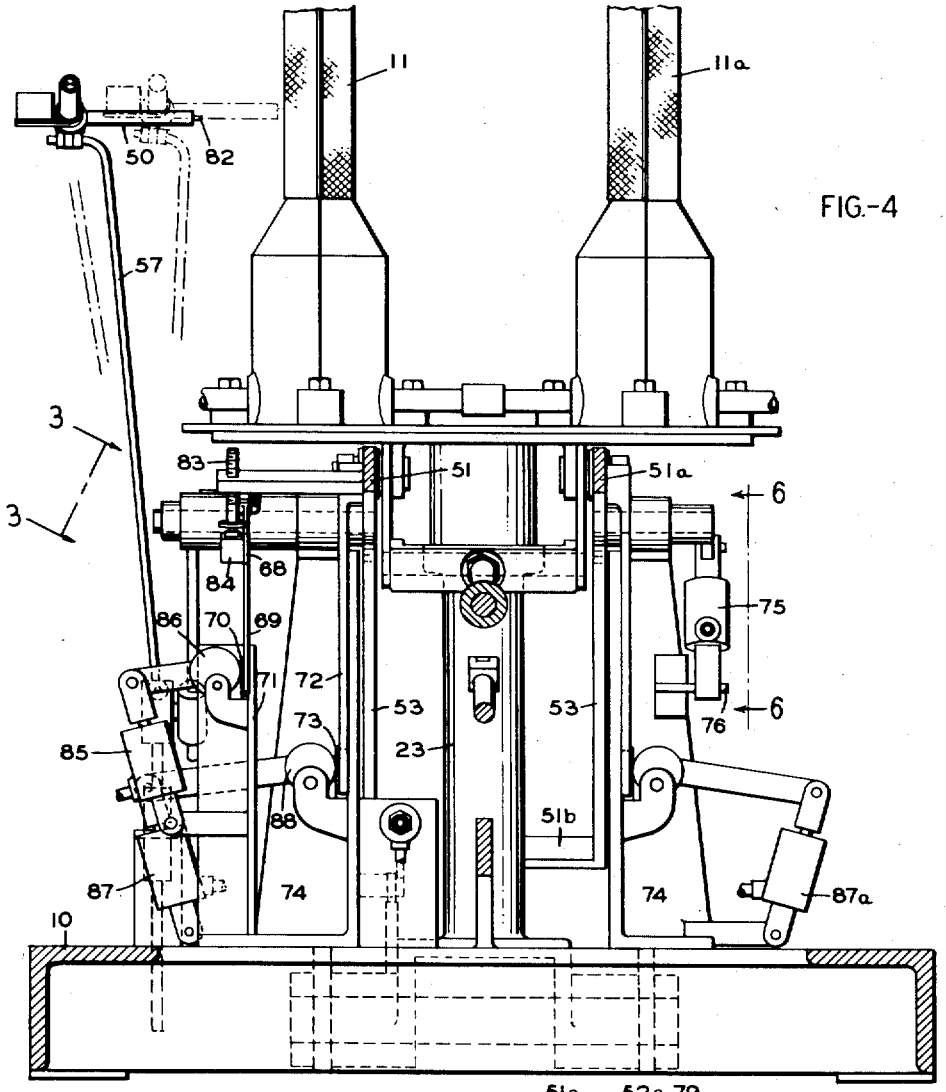
Fig. 4 is a fragmental sectional elevational view on an enlarged scale taken along the line 4—4 of Fig. 1.
Figure 6:
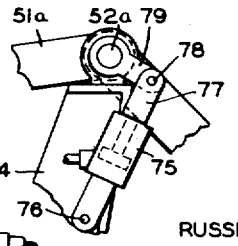
Fig. 6 is an enlarged detail elevational view of a portion of the measuring mechanism taken along the line 6—6 of Fig. 4.

Means is provided for causing the track 51 to automatically follow the position of stop arm 68 as set by rod 63 responsive to movement of the measuring finger 50. This means is best seen in Figs. 4 and 6. An air servomotor 75 has its cylinder pivotally connected at 76 to one of the pedestals 74. The piston of the servomotor has a piston rod 77 which is pivotally connected at 78 to a crank arm 79 which is rigidly connected to the pivot shaft 52a. This pivot shaft is rigidly fixed to the track portion 51a which is connected to the track portion 51 by means of a connecting bar 51b across the front end of the counterbalancing arms 53 as clearly shown in Figs. 4 and 7. Referring back to Fig. 5, it will be noted that a switch 80 is mounted on the tubular arm 54 having a switch actuator 81 which is responsive to a control member 82 extending slightly outwardly from the inner end of finger 50. This control member is mounted for longitudinal movement in the hollow finger 50 so as to actuate switch 80. As will presently appear, the closing of switch 80 actuates servomotor 75 so as to cause the track 51 to move in a clockwise direction from the full line position of Fig. 7 to the dot-dash position until a stop screw 83 on track 51 engages a switch 84 on the stop arm 68.

Means is provided for clamping the arcuate guide 69 of stop arm 68 in any adjusted position. This comprises a servomotor 85 mounted on the main frame and connected with an eccentric 86 also mounted on the main frame in position to clamp the guide arm 69 against the angle bracket 71.

Means is provided for clamping the arcuate guide arm 72 associated with track 51 in any adjusted position. This comprises a servomotor 87 pivotally mounted on the frame and having a connection with an eccentric 88 also mounted on the frame and adapted to clamp the guide arm 72 against a portion of the pedestal 74.

An air source under suitable pressure is provided at 88 as shown diagrammatically in Fig. 8 and this is connected through valves 89 and 90 to the press closing motors 35 and 35a as shown in Fig. 8. These valves are under the control of diaphragms 91 which in turn are connected by line 92 with a control valve 93 which is clearly shown in Figs. 1, 7 and 8. This is a normally closed valve and movable to open position by means of a bell crank 94 pivotally mounted on the frame and controlled by cam 95 rigidly connected with the vertical mounting member 23 for oscillation about the pivot 25 as the buck oscillates from forward to rearward position. The high point on the cam opens valve 93.

A snubber 96 is mounted in the base of the frame and this is connected by means of a crank arm 97 and link 98 with the vertical mounting member 23 so as to snub the movement of the buck as it oscillates forward and back. The movement of arm 97 is limited at the rear by stop 99 and at the front by means of stop 100 which carries a switch 101 for a purpose presently described.

It is believed that the operation of the machine will now be understood, certain control parts being mentioned as they occur in the oepration. With the parts of the machine in normal position as shown in Fig. 1, a shirt 102 with its front extending away from the operator has its sleeves drawn down over the bucks 11 and 11a and the cuffs are fastened in the holders 21. A touch of the operator's knees on two plates or control members 19, causes the buck wings or fins 13 to be swung outwardly by servomotor 18 and 18a, thus smoothing out the sleeves. The shoulder seam 103 will be high for a short sleeve or low for a long sleeve on the buck, depending upon the sleeve length. The operator now grasps the handle 55 as shown in Fig. 7 and moves the finger 50 up to the shoulder seam 103. In Fig. 7, the position of the parts in full lines show that before the control member 82 has been touched to the shirt on the buck, the connecting rod 57 has caused the rod 63 to be swung clockwise from the position of Fig. 1 and with it the stop arms 68. When the operator touches the control member 82 against the shoulder seam of the shirt on the buck and presses slightly, the switch 80 is closed which, referring to Fig. 8, completes an electric circuit from $L_1$, line 104, switch 80, lines 105 and 106 to solenoid 107 and then through line 108 and normally closed push button switch 109 to $L_2$. Energizing of solenoid 107 opens a normally closed combination air valve 110 and air from source 88 is admitted to pipe 111 and thence to clamping servomotor 85 and the track moving servomotor 75. The closing of switch 80, simultaneously energizes the coil of relay R (in parallel with solenoid 107) closing its contacts $R_1$ and $R_2$. The closing of contact $R_1$ completes a maintaining circuit for relay coil R by way of $L_1$, line 104, contact $R_1$, the relay coil R, and line 108 through push button 109 to $L_2$, thereby also maintaining energized solenoid coil 107. Closing of contact $R_2$ is for the moment ineffective. When servomotor 75 has swung track 51 around until the stop screw 83 engages the actuator for switch 84 to close the same, a circuit is completed from $L_1$ through line 104, contact $R_1$, lines 106 and 105, switch 84 (manual measuring switch 82 having been released), line 112, relay contact $R_2$, and lines 113 and 114 to a solenoid 115, and line 116 to $L_2$. This opens normally closed air valve 117 admitting air to pipe 118 and the track clamping servomotors 87 and 87a. Also, the closing of switch 84 completes a circuit from $L_1$ through line 104, contact $R_1$, line 105, switch 84, line 112, solenoid 119, line 108, push button 109 to $L_2$. Solenoid 119 opens a normally closed air valve 120, admitting air to pipes 121, 122 and 123. The supply of air through line 121 to diaphragm 124 closes normally open valve 125 thus closing the supply to the right hand end of motor 43 and opening an exhaust valve not shown. The supply through line 122 is to diaphragm 126 which opens normally closed valve 127 and supplies air under pressure through line 128 to the forward end of the cylinder of motor 43 so as to cause movement of the bucks from the full line position of Fig. 7 to the dot-dash position. The supply of air through line 123 is to valve 93 which is still closed. When the buck reaches the pressing position shown in dot-dash lines in Fig. 7, the high point of cam 95 opens valve 93, which admits air by way of pipe 92 to diaphragms 91 so as to open valves 89 and 90 and cause the motors 35 and 35a to close the pressing chest against the registering bucks.

The apparatus remains in pressing position until push button 109 is released by the operator. This breaks the circuit to relay R, whereupon opening of contact $R_1$ breaks the circuits to the solenoids 107 and 111 so that the servomotors 75 and 85 are exhausted, as are the pressure producing cylinders 35 and 35a and front end of cylinder 43, while air is again admitted to the back end of cylinder 43 so as to swing the bucks forwardly. Note that solenoid 115 is not deenergized, however, even though its original circuit including contacts $R_1$ and $R_2$ is broken, because a separate or shunt circuit from $L_1$ through lines 104 and 129, switch 101 (now closed) and line 114 through solenoid 115 and line 116 to $L_2$, makes it independent of the relay or of push button 109. This is for the purpose of holding the track 51 clamped in position by servomotors 87 and 87a, as before mentioned. Now, when the bucks have returned to the full forward position, arm 97 engages switch 101 so as to open it, thus breaking the circuit to solenoid 115 and allowing the servomotors 87 and 87a to exhaust so as to swing the track 51 back to its unoperated position as shown in full lines in Fig. 7. Switch 84, being again open, all parts have now returned to the normal position of Figs. 1 and 8.

I have thus provided a machine wherein the operator has only to drape the sleeves of the shirt on the two bucks in their forwardmost position, after which he touches the control finger 50 and its protruding control member 82 to the shoulder seam of the shirt sleeve whereupon the entire operation occurs automatically until the press is closed. The bucks move away from the operator to the heated pressing chests so that there is no danger of the operator being burned or having his fingers caught as the pressing chests close for a pressing operation. At the close of the operation, a momentary opening of push button 109 causes the press to return to its original position. I have thus provided a very fast and efficient press.

What I claim is:

1. In combination, a frame, a pair of upright bucks having a generally vertical mounting on said frame, said mounting having a pivot connection at its lower end with said frame, said mounting having a slidable connection with each buck for guiding said bucks up and down relative to said frame, a pair of pressing chests for each said buck on the rear of said frame spaced from said bucks and spaced radially with respect to said pivot connection, each said buck being movable about said pivot connection into registration between its associated pair of said chests, power means connected to said bucks for oscillating said bucks about said pivot mounting into registration, and power means connected to said chests for pressing each of said pair of chests against a buck in registration between them.

2. The combination of claim 1 including means connected to said bucks for controlling the position of said bucks on said vertical mounting, a measuring finger movable lengthwise of an article supported on said bucks, and an operative connection between said finger and said controlling means.

3. The combination of claim 2 wherein said means controlling the position of said bucks comprises a track pivotally mounted on said frame and extending adjacent the path of travel of said vertical mounting from front to rear as said bucks oscillate about said pivot connection and a follower on said bucks engageable with said track during said buck oscillation, and an operative connection between said finger and said track.

4. The combination of claim 3 wherein said last named operative connection comprises a pilot device operatively connected to said finger, a servomotor connected to said track for controlling the position of said track, and a power circuit for energizing and deenergizing said servomotor responsive to said finger and pilot device, whereby said track is moved in response to said finger and pilot device.

5. The combination of claim 1 including means for simultaneously moving said bucks in an up-and-down direction on said vertical mounting and for oscillating said mounting about said pivot connection, a measuring finger on said frame movable lengthwise of an article supported on said bucks, and an operative connection between said finger and said last named means.

6. In combination, a frame, a first pressing member on said frame, a second pressing member coacting with said first pressing member and being mounted on said frame, said members being mounted for relative movement into and out of pressing relation with each other, one of said members being an article supporting member, one of said members having a mounting on said frame for movement endwise of itself whereby to vary the zone of registration between said members, means operatively connected with said last mentioned member for moving the latter endwise of itself, an operator-operated device mounted for relative movement adjacent and lengthwise of said article supporting pressing member whereby said device may measure the relative length of an article supported thereon, and an operative connection between said device and said last named means controlling the movement of said last named means responsive to movement of said device.

7. The combination of claim 6 including power means on said frame for moving said members into pressing relation and a control member on said device operatively connected with said power means for causing actuation of said power means by movement of said control member substantially into engagement with an article supported on said article supporting pressing member.

8. In combination, a frame, a first pressing member on said frame, a second pressing member coacting with said first pressing member and being mounted on said frame, said members being mounted for relative movement into and out of pressing relation with each other, one of said members being an article supporting member, one of said members having a mounting on said frame for movement endwise of itself whereby to vary the zone of registration between said members, means operatively connected with said last mentioned member for moving the latter endwise of itself, a track pivotally mounted on said frame, a follower mounted on said endwise movable member and engageable with said track as said endwise movable pressing member moves toward pressing relation with the other pressing member to cause said endwise movable member to move endwise of itself, a measuring finger movable lengthwise of said article supporting member, and an operative connection between said finger and said track for varying the angular position of the latter around its pivot responsive to the position of said finger, the variation in angular position of said track determining the extent of endwise movement of said endwise movable member.

9. The combination of claim 8 including power means on said frame for moving said pressing members into pressing relation, and a control member on said finger operatively connected with said power means for causing actuation of said power means by movement of said control member substantially into engagement with an article supported on said article supporting pressing member.

10. In combination, a frame, a first pressing member on said frame, a second pressing member coacting with said first pressing member and being mounted on said frame, said members being mounted for relative movement into and out of pressing relation with each other, one of said members being an article supporting member, one of said members having a mounting on said frame for movement endwise of itself whereby to vary the zone of registration between said members, means operatively connected with said last mentioned member for moving the latter endwise of itself, a track pivotally mounted on said frame, a servomotor connected with said track for moving the latter about its pivot, a follower on said endwise movable pressing member and engageable with said track as said endwise movable pressing member moves toward pressing relation with the other pressing member to cause movement of said endwise movable pressing member endwise of itself, a stop member movably mounted on said frame and engageable by said track to limit movement of the latter about its pivot, a measuring finger movable lengthwise of said article supporting member, an operative connection between said finger and said stop for positioning the latter responsive to finger movement, and a control member on said finger operatively connected to and controlling said servomotor and operable by engagement of said finger against an article supported on said article supporting pressing member.

11. The combination of claim 10 including power means on said frame for moving said pressing members into pressing relation, and a control member for actuating said power means responsive to engagement of said track with said stop.

12. In combination, a support, a pressing member on said support, a second support, a coacting pressing member carried thereon, one of said supports being mounted for movement relative to the other whereby one of said pressing members may be given a generally lateral movement into and out of registration with the other said pressing member, one of said members being mounted on its support for movement endwise of itself whereby to vary the zone of registration between said members, means for causing endwise movement of said endwise movable member comprising a follower attached thereto and a track pivotally mounted on the support which carries the other pressing member, said follower and track being engageable as said movable support carries its pressing member toward registration with the other said member, and a measuring finger movable lengthwise of one of said pressing members, said measuring finger being operatively connected to said track for varying the angular position of the latter around its pivot and consequently varying the endwise movement of said endwise movable member and varying the zone of registration between said members.

*13. In combination, a frame, a pair of upright bucks having a generally vertical mounting on said frame, said mounting having a pivot connection at its lower end with said frame, a pair of pressing chests for each said buck on the rear of said frame spaced from said bucks and spaced radially with respect to said pivot connection, each said buck being movable about said pivot connection into registration between its associated pair of said chests, each of said bucks and its associated pair of pressing chests providing cooperating pressing members, means providing movement of one of said cooperating pressing members endwise of itself to vary the zone of registration between said pressing members, power means connected to said bucks for oscillating said bucks about said pivot mounting into registration, and power means connected to said chests for pressing each of said pair of chests against a buck in registration between them.*

*14. In combination, a frame, a first pressing member on said frame, a second pressing member coacting with said first pressing member and being mounted on said frame, said members being mounted for relative movement into and out of pressing relation with each other, one of said members being an article supporting member, one of said members having a mounting on said frame for movement endwise of itself whereby to vary the zone of registration between said members, means operatively connected with said last mentioned member for causing movement of the latter endwise of itself, means for indicating a movement of said last-named means commensurate with the length of an article supported on said article supporting member, and operator controlled means operatively connected with said endwise movable member moving means for controlling the latter.*

References Cited in the file of this patent or the original patent

UNITED STATES PATENTS

| Number | Name | Date |
|---|---|---|
| 2,278,959 | Williams | Apr. 7, 1942 |
| 2,375,947 | Robbel | May 15, 1945 |
| 2,479,729 | Davis | Aug. 23, 1949 |
| 2,481,399 | Davis | Sept. 6, 1949 |